United States Patent Office 3,025,165
Patented Mar. 13, 1962

---

3,025,165
YOGURT CONTAINING AN UNSATURATED VEGETABLE FAT
Joe Metzger, Long Island City, N.Y., assignor to Beatrice Foods Co., Chicago, Ill., a corporation of Delaware
No Drawing. Filed July 27, 1959, Ser. No. 829,556
6 Claims. (Cl. 99—59)

My invention relates to a yogurt containing an unsaturated fat or oil such as corn oil, cotton seed oil, coconut oil, soy bean oil and other similar oils in place of butterfat. That is, I have made a butterfat-free yogurt having uniformly dispersed throughout its body a highly unsaturated fat or oil in varying proportions whereby one may find the oil-containing product palatable, as distinguished from the oil itself which may, in some cases, be distasteful to a particular person.

As is well known, yogurt is a product which results from culturing normal milk, partly skimmed milk or skim milk with a conventional yogurt culture usually *Lactobacillus bulgaricus* and *Streptococcus thermophilus* and generally with the exclusion of any other kind of curdling agent. When the yogurt contains less than .3% butterfat, it is denoted as "yogurt cultured skimmed milk"; if it contains between .4% and 2.9% butterfat, it is characterized as "yogurt cultured milk product, 'butterfat partially removed'"; and should it contain no less than 3.0% butterfat, it is "yogurt cultured milk." The yogurt must contain at least .6% acidity expressed in terms of lactic acid.

In addition to, or in lieu of, the milks described above, the yogurt may be made from condensed skim milk, skim milk powder, chocolate milk, whole condensed milk, and whole milk powder and mixtures of the same by the usual yogurt making procedure employing a conventional culture as set forth. Other ingredients include water, sugar, or other sweetener, fruit flavoring, such as orange, as well as standard commercial natural and artificial flavors and certified colors and vitamins.

An eight ounce sealed cup or paper board container or a wide mouth glass container are the presently employed commercial packages of yogurt.

The product of this invention is one in which the butterfat content of yogurt is replaced, as stated, by an unsaturated fat or oil such as corn oil, cotton seed oil, coconut oil, soy bean oil, and other similar oils, these oils being added in varying amounts to skimmed milk (containing no butter fat), and the mixtures are homogenized and emulsified in such a way that the oils are universally distributed throughout the milk. This method makes the unsaturated oil more palatable than in its original state. A flavor or extract is sometimes incorporated into the oil to give it a more distinctive flavor.

Products such as edible vegetable oils, namely, corn oil, cottonseed oil, coconut oil, soy bean oil, and similar oils in amount of about 1.5 to 6.4%, and which are incorporated in a liquid skim milk may be made into yogurt having the oil uniformly dispersed therein. The finished yogurt product may or may not contain any desired amount of sugar or other sweetener to suit the taste, as well as fruit flavors including natural or artificial flavors, and, in some cases, certified colors, may be included. Also, vitamins may be introduced into the yogurt such as vitamin C, as by introducing sodium ascorbate or ascorbic acid or one of its well known derivatives in amounts to give a vitamin C content of from about 60 to 100 milligrams per eight ounce cup.

The various products, as stated, will be palatable, whereas the vegetable oil itself might be objectionable to the taste of many people for whom yogurt and certain fats are beneficial but because of physical impairments, notably heart conditions, one cannot consume ordinary animal fats such as milk fat or saturated fats because it is believed that the cholesterol content must be maintained at a low level in such cases.

*Example I*

In this example, raw skim milk fortified with 1.5% milk solids not fat with about 4% added unhydrogenated corn oil is heated to about 185° F., homogenized at 2000 p.s.i.g. and pasteurized at about 185° F. for 10 minutes. The pasteurized milk is cooled in the vat to about 110° F. and inoculated with 2½% of a mixed culture of *Lactobacillus bulgaricus* and *Streptococcus thermophilus*. The product at this point is filled into eight ounce cardboard containers which are then capped and incubation allowed to proceed in a room having a temperature at about 110° F. to a desirable gel strength free of whey. Thereafter, the capped containers are held in a cold room to inhibit bacterial growth, the temperature being about 38° F.

The foregoing example was modified as follows:
In another example, I added about 3.5% of the oil and in a further example we added 6.4% of the oil.

Also, I pasteurized in one instance at 180° F. for 10 minutes and in another case at 190° F. for 10 minutes.

The pasteurized milk was cooled to about 115° F. in one example and in another to about 110° F.

Instead of adding 2½% of the yogurt culture, I added in one case ½% and in another I used 3%.

The incubation temperature in one example was 115° F.

I find it most practicable to form an emulsion of the oil employed, in the skim milk, as described in the foregoing examples. Such emulsion is formed by homogenizing the fat into the liquid milk with or without the aid of emulsifying agents.

The resultant yogurt in all cases is a desirable product and has the oil uniformly dispersed therethrough and is quite palatable.

My tests show that the pasteurizing temperature may vary between 180° to 200° F. for 30 minutes to 10 minutes.

Also, the temperature of the mix at the time of introducing the culture will vary between 110° and 115° F., and the temperature of incubation will vary between 110° F. to 115° F., and the pH at the end of this incubation period will vary between pH 4.0 to pH 4.7.

The temperature of the cold room according to my observations will vary between about 38° F. and 45° F.

As stated, the oils which are introduced are of low saturation or completely unsaturated and of vegetable origin and unhydrogenated.

I prefer a fortified fat-free milk, such as skim milk or reconstituted milk powder in which the fat is added as edible vegetable fat and its content will vary between 1.5% and 6.4% as above recited. Any desired fat content can be incorporated by the use of the emulsion of skim milk and fat, and suitable emulsifying agents may be included with the liquid skim milk, or oil employed.

While I have referred to sodium ascorbate, other sources of vitamin C may be included, such as ascorbic acid and its well known derivatives, but it is found that sodium ascorbate is very useful and effective. The quantity of ascorbic acid or ascorbic acid compound or derivatives is critical in. that wherever employed it is important that from about 60 to 100 milligrams of vitamin C per eight ounces be initially incorporated in the yogurt.

The ascorbic acid or ascorbic acid compound is introduced in a suitable flavor such as orange flavor which is in liquid form, but in addition to the orange extract, other extracts such as lemon, tangerine, grapefruit, lime, vanilla and similar well known extracts may be employed. The citrus extract is usually preferred, and has the desired effect described in this case.

I claim:

1. A process of preparing a yogurt containing an unsaturated vegetable fat which comprises forming an emulsion of such fat in milk, and thereafter preparing the yogurt by incubation with a yogurt bacteria.

2. A process according to claim 1 wherein prior to incubation there is incorporated a sweetener.

3. A process according to claim 1 wherein prior to incubation there is incorporated a fruit flavoring.

4. A process according to claim 1 wherein prior to incubation there is incorporated a certified color.

5. A process according to claim 1 wherein vitamin C is incorporated in the milk before incubation.

6. A process according to claim 1 wherein flavoring enriched with vitamin C is added to the milk before incubation.

References Cited in the file of this patent

UNITED STATES PATENTS

| | | |
|---|---|---|
| 1,710,133 | Winkler | Apr. 23, 1929 |
| 2,659,676 | Howard | Nov. 17, 1953 |
| 2,707,152 | Chaney et al. | Apr. 26, 1955 |
| 2,824,804 | Mishima | Feb. 25, 1958 |
| 2,890,959 | Phillips | June 16, 1959 |

OTHER REFERENCES

"The Low Fat Low Cholesterol Diet," by Dobbin et al., 1951, pages 191 and 272.